United States Patent [19]

Hollerweger et al.

[11] Patent Number: 4,720,084

[45] Date of Patent: Jan. 19, 1988

[54] HYDRAULIC ENGINE MOUNT

[75] Inventors: Heinz Hollerweger, Ingolstadt; Johannes van den Boom, Kösching; Geert Kuipers, Ingolstadt, all of Fed. Rep. of Germany

[73] Assignee: Audi AG., Ingolstadt, Fed. Rep. of Germany

[21] Appl. No.: 741,872

[22] Filed: Jun. 6, 1985

[30] Foreign Application Priority Data

Jun. 7, 1984 [DE] Fed. Rep. of Germany ....... 3421137

[51] Int. Cl.⁴ .................. B60G 15/04; F16M 5/00; F16M 13/00; F16F 9/46
[52] U.S. Cl. .................... 267/217; 188/299; 248/562; 267/140.1
[58] Field of Search ............... 267/8 R, 8 D, 35, 113, 267/140.1; 180/300; 188/298, 299, 378, 379, 380; 248/562, 634, 636, 566; 123/192 R

[56] References Cited

U.S. PATENT DOCUMENTS

| 2,535,080 | 12/1950 | Lee | 267/140.1 |
| 4,399,974 | 8/1983 | Takei | 267/140.1 |
| 4,428,569 | 1/1984 | Takei | 267/140.1 |
| 4,537,275 | 8/1985 | Kimura et al. | 180/300 |

FOREIGN PATENT DOCUMENTS

| 2802896 | 7/1979 | Fed. Rep. of Germany . | |
| 2947018 | 5/1981 | Fed. Rep. of Germany . | |
| 3009747 | 9/1981 | Fed. Rep. of Germany . | |
| 3244295 | 5/1984 | Fed. Rep. of Germany . | |
| 3340153 | 8/1984 | Fed. Rep. of Germany . | |
| 0054249 | 3/1983 | Japan | 267/140.1 |
| 0589482 | 1/1978 | U.S.S.R. | 188/380 |

OTHER PUBLICATIONS

Ozawa, (abstract of Japanese Application No. 55-151699) patented 10-29-1980.

"Motorlagerungen im Fahrzeug mit integrierter hydraulischer Dampfung—ein Weg zur Verbesserung des Fahrkomforts", *Automobiltechnische Zeitschrift*, 1979, pp. 533-536, 539.

*Primary Examiner*—Andres Kashnikow
*Assistant Examiner*—Robert J. Oberleitner
*Attorney, Agent, or Firm*—Karl Hormann

[57] ABSTRACT

A hydraulic engine mount is provided, the dynamic characteristics of which may be varied in response to engine performance parameters. In particular, the invention provides for a hydraulic engine mount comprising a core for attachment to an engine and the base for mounting to a frame, the core and the base being connected to each other by an elastic member, at least two fluid filled and elastically deformable chambers divided by a diaphragm, a throttle for permitting a limited exchange of fluid between the chambers, an absorptive mass selectively movable by the core, and a selectively operable connection between the core and the absorptive mass.

10 Claims, 11 Drawing Figures

HYDRAULIC ENGINE MOUNT

This application is related to application Ser. No. 741,862 filed June 6, 1985, now U.S. Pat. No. 4,671,227.

BACKGROUND OF THE INVENTION

The invention relates to apparatus for connecting together elements which are subject to movements or vibrations of varying frequencies and amplitudes relative to one another. More particularly, the invention relates to hydraulic engine mounts of the kind provided with selectively operable controls for neutralizing or absorbing or at least damping such vibrations, at least within a predetermined range of frequencies and amplitudes as they may occur between an internal combustion engine and an automotive frame supporting the engine.

In their most rudimentary form, automotive engine mounts comprise no more than a block of elastic material, such as rubber, provided with threaded bolts facing in substantially opposite directions for connecting an engine to a frame. Such mounts, beyond their inherent elasticity, are incapable of absorbing excessive engine movements, and since engines do not always run smoothly, movements generted by them are simply transferred to the automotive frame or, in the worst case, cause rupture of the elastic component of a mount. In any event, such mounts may be the source of considerable irritation to the motorist. They are not compatible with modern notions or motoring comfort. They may, however, contribute significantly to the deterioration of automobiles.

It is, therefore, not surprising that the industry has sought to improve the performance, i.e., the absorptive characteristics of engine mounts. This has led to the development of so-called hydraulic engine mounts. Hydraulic engine mounts usually comprise a core or support, for attachment to an engine, and a base or anchor for connection with the frame of an automobile. Core and base may be connected by an elastic element, but the operativeness of such mounts resides in the fact that they are additionally provided with at least two elastically deformable chambers filled with a fluid and separated from each other by a diaphragm mounted for limited movement and/or provided with a throttle, to permit an exchange of fluid between the chambers in response to relative movements between the core and the base. Broadly speaking, the capability of such mounts of absorbing or dampening relative movements between core and base is a function of the elasticity of the chambers and of the capacity of the throttle.

Such mounts are known from West German Pat. No. 28 02 896, for instance. They may yield a favorable motion transfer function for an adjustable range of frequencies, based on their parameters. Except for their static stiffness, the transfer function of such mounts initially decreases with increasing frequencies to a minimum value and then increases to a maximum value in the resonant range. Further increases in frequency again lead to decreased transfer characteristics which lie, however, above the level of the static stiffness. Maximum absorption is obtained near the initial minimum value.

Another type of hydraulic engine mount incorporating an absorptive mass is known from West German Pat. No. 29 47 018. The transfer function of this type of mount initially increases from a static stiffness to the resonant frequency; thereafter it drops to an absorptive value and finally it approaches an asymptotic value of final stiffness below the static stiffness. This mount is based upon the principle of moving the point of absorption proportionally to the revolutions of the engine and provides for the possibility of controlling the characteristics of the mount.

These mounts are to some extent of satisfactory performance; nevertheless, there is a need for further improvements.

Thus, it is an object of the invention to provide a hydraulic engine mount of improved motion transfer characteristics.

Another object of the invention is to provide an improved hydraulic engine mount, the parameters of which may be selectively variable.

A further object of the invention is to provide an improved hydraulic engine mount which incorporates the advantageous features of prior art mounts without suffering from their disadvantages.

It is yet another object of the invention to provide an improved hydraulic engine mount having an absorptive mass which may be selectively connected and disconnected.

An object of the invention also resides in providing a hydraulic engine mount having a frequency response which is variable in dependence of engine movement.

Other objects of the invention will in part be obvious and will in part appear hereinafter. The invention accordingly comprises a mechanism and system possessing the construction, combination of elements and arrangement of parts which are exemplified in the following detailed disclosure.

SUMMARY OF THE INVENTION

A hydraulic engine mount is provided the dynamic characteristics of which may be varied in response to engine performance parameters. In particular, the invention provides for a hydraulic engine mount comprising a core for attachment to an engine and the base for mounting to a frame, the core and the base being connected to each other by an elastic member, at least two fluid filled and elastically deformable chambers divided by a diaphragm, a throttle for permitting a limited exchange of fluid between the chambers, an absorptive mass selectively moveable by the core, and a selectively operable connection between the core and the absorptive mass.

Advantageously, the absorptive mass may be selectively connected to the diaphragm. The selectively operable connection may be provided by a pneumatic chamber of variable volume and elasticity positioned between the absorptive mass and the core. The selectively operable connection may also be provided by a solenoid for establishing a connection of variable elasticity between the absorptive mass and the core.

For yielding a good absorptive effect, the diaphragm may be either moveable or change its form when the volume of one of the chambers is changed. In this manner, the introduction of vibrations induced in the core of the mount is transferred as movements of the absorptive mass by way of the changed volumn of the chambers.

It is particularly advantageous not to connect the absorptive mass to the diaphragm in a rigid manner. Instead, it may be coupled to the diaphragm—in some instances by way of intermediate coupling means—by a connection having a selectively variable modulus of elasticity. The modulus of elasticity of such a connection may vary, for instance, between zero when the absorptive mass is disconnected from the diaphragm up to an infinite value at which point the mass is rigidly connected.

The means for providing such a variable connection may be a fluid cushion between the absorptive mass and the diaphragm. The fluid cushion may be an inflatable pneumatic chamber, the degree of inflation or internal pressure of which determines the degree of connection between the absorptive mass and the diaphragm.

The pneumatic chamber may comprise an inflatable elastic tube of annular configuration coupled at one side to the absorptive mass and on the other side to a flange connected to the diaphragm. Hence, the annular tube may circumscribe another chamber which may be separately inflatable. The pneumatic pressures in the tube as well as in the chamber surrounded by it may be regulated by way of appropriate valves.

A further embodiment of the invention would provide a further inflatable pneumatic chamber between the absorptive mass and the support structure of the mount, i.e., the frame of an automobile. A valve may be provided to control the pressure within such a chamber.

The valves used in connection with hydraulic mounts in accordance with the present invention may be controlled in their various settings by signals generated proportionally to the revolutions of an engine, so that by various combinations and degrees of opening, the absorptive characteristics of the mount may be adjusted over a wide range. By an appropriate control of each valve, absorptive characteristics for the mount are possible which in each range of engine revolutions are superior to the static stiffness of the mount.

In order to provide a soft mount even at engine revolutions below idling speeds so that movements even of large amplitudes may be absorbed, the transfer function of the mount may be adjusted by rendering the chamber directly affected by the core soft, or by cancelling the effect of the throttle between the chambers. This may be accomplished by providing a soft membrane in the wall of the chamber with a controllable pneumatic chamber behind the membrane, or by a selectively openable bypass extending substantially parallel to the throttle.

In another embodiment, the valves may be controlled by other signals such as physical engine movements, for instance.

It may also be possible to provide a third chamber connected to the chamber affected by the core, by a fluid conduit. In such an embodiment the absorptive mass would be connectible to an elastically moveable wall of the third chamber. The connection of the moveable wall and the absorptive mass may be established by an electromagnet. The moveable wall may therefore be provided with an extension of ferritic material which may operate as a plunger for the electromagnetic coil of a solenoid mounted on the absorptive mass. When electrically energized, the solenoid attracts the absorptive mass against the moveable wall, the degree of attraction and, hence, coupling between the wall and the mass being a function of the level of solenoid energiztion. Such an arrangement is deemed to be of particular advantage in that the required electrical connections pose no technical problems.

It may also be possible to integrate the absorptive mass into the diaphragm dividing the hydraulic chambers of the mount. In such an embodiment, the diaphragm may be formed of two layers forming a chamber between them wherein the absorptive mass may be suspended. By regulating the internal pressure of the diaphragm chamber the degree of connection between the absorptive mass and the diaphragm is determined.

In another embodiment, a flange may be connected to the diaphragm to form a wall of a pneumatic chamber, a further wall of the chamber being formed by the absorptive mass. The freedom of movement, or degree of coupling, of the absorptive mass may thus be regulated by applying pneumatic pressure to opposite sides of the absorptive mass. The pressure applied to one side at least should be variable.

DESCRIPTION OF THE DRAWINGS

The novel features considered characteristic of the invention have been set forth with particularity in the appended claims. The invention itself, however, in respect of its organization as well as its method of operation together with other objects and advantages thereof will be understood best from the following description of the list illustrative embodiments when read in connection with the accompanying drawings, wherein:

FIG. 1 depicts a conventional hydraulic engine mount which is equipped with an absorptive mass. By virtue of the absorptive mass the mount attains a dynamic stiffness which is less than its static stiffness. The mount is seen to have a core 10 which typically serves to connect to an engine (not shown), and a base 12 for connection to the frame (not shown) of an automotive vehicle. The core 10 and the base 12 are connected to each other by a resilient member 14 which is preferably made of rubber. A bracket 16 is attached, for instance by vulcanization, to the resilient member 14. The bracket 16, in turn, is connected to a body member 18. At its upper portion the member 18 is provided with a resilient membrane 20 which serves to absorb or balance vibrations of the bracket 16 relative to the member 18. Large deflections of the membrane 20 are limited by an abutment 22 extending over the membrane 20. At its side opposite the membrane 20 the body 18 is limited by an absorptive mass 24. The membrane 20, the absorptive mass 24 and a wall member connecting them enclose a chamber 26 of predetermined volume. Pneumatic pressure within the chamber 26 is adjustable. By adjusting the pressure within the chamber 26, the degree of coupling between the absorptive mass 24 and the bracket 16 may be controlled.

Figure 1:
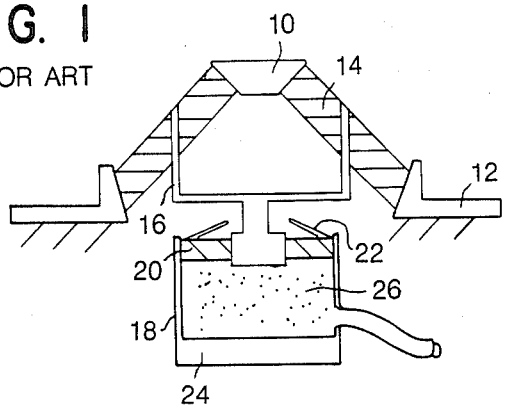
FIG. 1 is a view, in longitudinal section, of an engine mount in accordance with the prior art.
Figure 2:
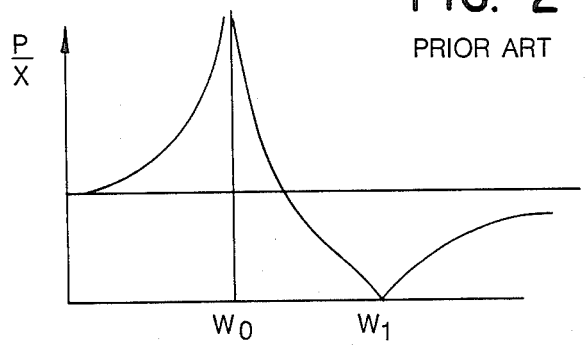
FIG. 2 is a schematic representation of the function of the mount of FIG. 1.

The principle of the function of the mount of FIG. 1 is represented by the diagram of FIG. 2. Commencing at a static stiffness, the stiffness of the mount increases to a frequency $\omega_0$, and thereafter decreases to an absorptive level $\omega_1$. At frequencies in excess of $\omega_1$ the stiffness of the mount again increases and asymptotically approaches a boundary value, which is, however, lower than the static stiffness.

As will be appreciated, the most favorable transfer characteristics of the mount are in the range of $\omega_1$, and, as described in German Pat. No. 29 47 018, attempts have been made to adjust the pressure within the chamber 26 to levels most favorable to given engine revolutions, i.e., to adjust the frequency $\omega_1$ to suit given ranges of engine revolution and the vibrations resulting therefrom.

However, even at a wide adjustment range, it is not possible in all circumstances to avoid the $\omega_0$ frequency. In fact, the more favorable the characteristics of the mount in the $\omega_1$ frequency range, the less favorable they are at frequency range $\omega_0$.

Figure 3:
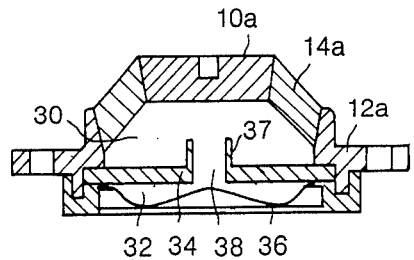
FIG. 3 is a view, in longitudinal section, of a dual chamber hydraulic engine mount in accordance with the prior art.

Characteristics different in principle from those described above may be obtained with mounts of the kind described in "Autotechnische Zeitschrift, 1979, pgs. 533 et seq". FIG. 3 depicts an improved version of such a mount. The mount of FIG. 3 is provided with a core 10a as well a base 12a. Core 10a and base 12a are interconnected by a resilient member 14a preferably made of rubber and shaped as a frusto-conical sleeve. The core 10a and a flexible wall 36 enclose the interior of the mount. The interior is preferably filled with a liquid. A wall member or diaphragm 34 is provided to divide the interior of the mount into two chambers 30 and 32. Movements of the core 10a entail changes in the volume of the first chamber 30. This change in volume, however, is compensated by fluid escaping into the secod chamber 32, there being provided for this purpose an opening 38 within the diaphragm 34. The chamber 32 which receives this fluid can, in turn, compensate for the change in its own volume because of the flexible yielding of the wall 36. The opening 38 within the diaphragm 34 is seen to be provided with a tubular extension 37. The extension 37 establishes a cylindrical column of fluid, the height and diameter of which are determined by the length and internal diameter, respectively, of the extension 37. The fluid column within the extension 37 corresponds to, or functions as, an absorptive mass; for movement of the core 10a induces movement of the fluid column. Owing to the inertia of the column, its movement sets in with a predetermined delay.

Figure 4:
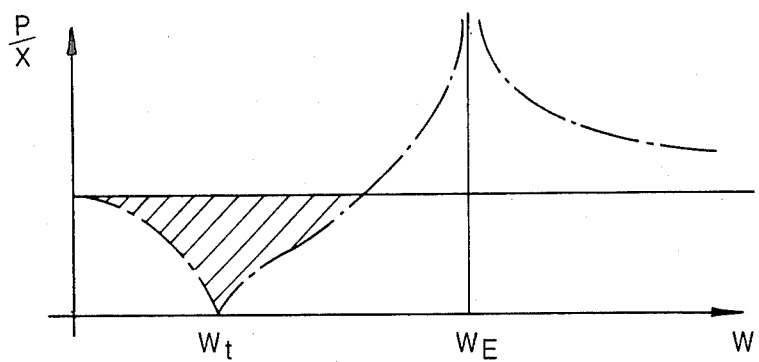
FIG. 4 is a function diagram of the mount of FIG. 3.

The motion transfer function of the mount of FIG. 3 is represented by the curve in FIG. 4. As shown, favorable transfer characteristics are obtainable in a frequency range $\omega_r$. The principle of an absorptive mass (liquid column) vibrating 180° out of phase i.e., a mass opposing the movements induced in the mount, yields the following effects: Commencing at a static stiffness, the transfer function initially decreases theoretically to zero; thereafter a resonant frequency develops and finally, for high frequency values an asymptotic final stiffness is obtained which is higher than the static initial stiffness. Values of low dynamic stiffness result only for a frequency range from zero to a maximum frequency determined by the inherent characteristics of the mount.

It is possible by means of the present invention to combine the advantages of the two different prior art mounts into a single mount, and to avoid the specific disadvantages of the prior art mounts.

Figure 5:
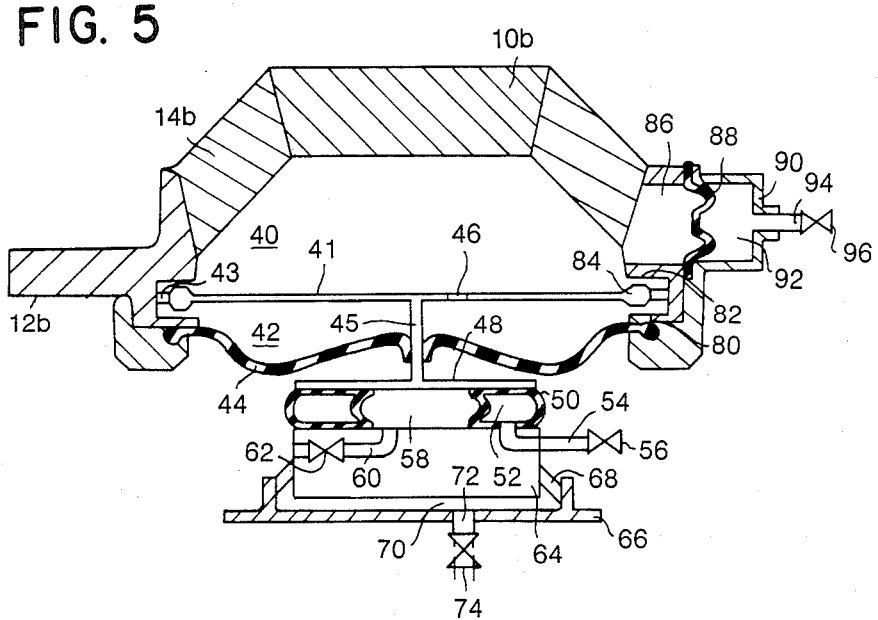
FIG. 5 is a view, in longitudinal section, of a preferred embodiment of a hydraulic engine mount in accordance with the invention.

An embodiment of a mount in accordance with the invention which incorporates the advantages of the prior art systems without suffering from their disadvantages is shown in FIG. 5. The mount is provided with a core 10b which may be connected to an internal combustion engine (not shown) of the vehicle. Also provided is a base 12b to be connected to the frame (not shown) of the vehicle. The core 10b and base 12b are connected together by a resilient member 14b. Together with a flexible wall 44, the core 10b and the member 14b enclose a chamber. This chamber is divided into two sections 40 and 42 by a diaphragm 41. The diaphragm 41 is of substantially circular configuration. It is attached along its periphery to the base 12 by means of an elastic membrane 42. Movement or exitation of the core 10b thus leads to building up of positive or negative pressure (depending upon the direction of such exitation), within the chamber 40, and this pressure may be balanced by a corresponding movement of the diaphragm 41. The diaphragm 41 is moveable because of its elastic suspension 43. Since the diaphragm 41 also constitutes a wall of the chamber 42, pressure is transferred to the chamber 42 where it may be compensated or balanced by a corresponding deflection of the flexible wall 44.

There is also present within the diaphragm 41 a throttle member 46 which contributes to the balancing of pressure in the chambers 40 and 42 by providing for an exchange of fluid between these chambers.

The diaphragm 41 is seated along it periphery within an annular recess or groove of the base 12b. The recess has upper and lower wall members or flanges 80 and 82, one of which, depending upon the direction of movement of the core 10b, will be engaged by the diaphragm 41 in case of large deflections thereof. Once the diaphragm 41 engages one or the other of walls 80 and 82, further balancing of pressure between the chambers 40 and 42 would not be possible. At low frequencies, balancing of pressure within the chambers 40 and 42 takes place by a fluid exchange through the throttle 46.

At higher frequencies, however, an exchange of fluid by the throttle 46 cannot be accomplished at a sufficient rate. Since the chambers 40 and 42 are completely filled with fluid, the mount, therefore, becomes increasingly hard. That is to say, small amplitudes are absorbed by movement of the diaphragm 41; larger amplitudes could not be compensated or absorbed. However, under certain circumstances such hardness of the such hardness of the mount may be desirable.

In accordance with the invention, a protrusion 45 is mounted on the diaphragm 41. The protrusion 45 extends through the chamber 42 as well as through the flexible wall 44. A seal is provided in the wall 44 where the protrusion 45 extends through it to prevent an escape of fluid from the chamber 42. At its end protruding from the chamber 42, the protrusion 45 is provided with a flange 48 to which is affixed an elastic annularly shaped tube 50. The flange 48 is of circular configuration, and the tube 50 is mounted along the periphery of the flange 48. An absorptive mass 64 is mounted on the tube 50, on its side facing away from the flange 48. Thus, a chamber 58 is enclosed between the flange 48, the absorptive mass 64, and the tube 50. The interior of the tube 50 also constitutes a chamber 52 which may be filled with a gaseous medium. The chamber 52 is connected to a valve 56 by a conduit 54, and the chamber 58 is connected to a valve 62 by a conduit 60.

The absorptive mass 64 is also connected to a console 66 which may be attached to an automobile frame (not shown). The connection between the absorptive mass 64 and the console 66 is accomplished by an elastic membrane 68. The membrane 68 circumferentially embraces the absorptive mass 64 and forms a hermetically sealed chamber 70 between the mass 64 and the console 66. A duct 72 connects the chamber 70 to a valve 74.

A further chamber 86 is provided laterally of the chamber 40 and is sealed by a soft resilient membrane 88. The side of the membrane 88 facing away from the chamber 86 and a wall member 90 of the base 12b provide for a further chamber 92 which may be vented or pressurized through a valve 96 and duct 94.

The mount of FIG. 5 functions in the following manner: The chambers 40 and 42 are filled with a fluid, such as water, in a manner well known in the art. Lower amplitude vibrations or movements acting on the core 10b may be compensated or absorbed by movement of the diaphragm 41 which, as mentioned above, is elastically suspended by the membrane 43. Movements of larger amplitude cause the peripheral portion 84 of the diaphragm 41 to move into engagement with one of the flanges 80 or 82 (depending upon the direction of diaphragm movement), so that differential pressure caused by movement acting upon the core 10b may be compensated or balanced to some extent by fluid flowing between the chambers 40 and 42 through the throttle 46. In this respect, the mount operates upon principles known from German Pat. No. 28 02 896.

However, to take advantage of the principle of absorption, the mount in accordance with the invention is provided with an absorptive mass 64 which is selectively connectable to the flange 48 mounted on the protrusion 45. Where the connection, i.e., the effect of the absorptive mass 64 is not desired, the chambers 52 and 58 enclosed and embraced, respectively, by the tube 50 are vented to the exterior by the valves 56 and 62. Also, the valve 74 may be opened to vent the chamber 70 enclosed between the absorptive mass 64 and the member 66.

When it is desired to engage the absorptive mass 64, the valve 56 and/or the valve 62 may be closed to prevent further venting of the chambers 52 and/or 58. Movements or vibrations of the flange 48 are, therefore, diverted or transferred to the absorptive mass 64 now connected to the flange 48 to a degree depending on the pressure within the chambers 52 and/or 58. The degree of stiffness of the connection may be varied or adjusted by closing any one or both of the valves 56 and 62.

Furthermore, the degree of coupling or stiffness may additionally be controlled by selectively pressurizing the chambers 52 and 58 independently of atmospheric pressure. By raising the pneumatic pressure within the chambers 52 and/or 58 above the level of atmospheric pressure, the degree of coupling of the absorptive mass 64 to the flange 48 may be significantly increased. The strength of the connection between the absorptive mass 64 and the flange 48 may additionally be controlled by the level of pressure within the chamber 70. Hence, when the valve 74 is closed, the absorptive mass 64 is connected to the console 66 and the frame (not shown) in a relatively rigid manner. Thus, movements or vibrations to be executed by the mass 64 are reduced. On the other hand, when the valve 74 is opened the absorptive mass 64 may vibrate more freely.

As mentioned above, the mount in accordance with FIG. 5 is relatively soft at movements of low amplitudes because the diaphragm 41 may yield to such limited movements. As the amplitudes increase, the stiffness of the mount increases as well since balancing of pressure between the chambers 40 and 42 results from an exchange of fluid through the throttle 46. This may be disadvantageous whenever the core 10b is excited or affected by movements of low frequency and high amplitudes. Such excitations may occur, for instance, when an engine is being started, when it may be running irregularly during its warm-up phase or when less than all its cylinders are operating properly. Jolts, i.e., high amplitude movements, occurring at or below idling speeds of an engine would result in hard knocks as the diaphragm 41 would immediately move into engagement with one of the flanges 80 or 82. However, for maintaining the mount soft under such special operating conditions, the chamber 86 has been provided. The chamber 86 is directly connected to the chamber 40 and is sealed by the soft membrane 88. Abrupt pressure increases within the chamber 40 result in deflection of the membrane 88. Therefore, the diaphragm 41 need not absorb such abrupt eruptions of pressures. The membrane 88 may advantageously be formed as a rolling bellows and may be relatively soft to absorb vibrations or movements of large amplitude.

At higher frequencies, the softness of the mount may be undesirable. Thus, the valve 96 is provided for venting or closing the chamber 92 located behind the membrane 88. When the valve 96 is opened, the membrane 88 may freely move with respect to the chamber 92. However, when the valve 96 is closed, movement of the membrane 88 would result in increased pressure in the chamber 92 and this, in turn, would substantially limit the deflection of the membrane 88 with respect to the chamber 92. This limitation in the deflectability of the membrane 88 and the resultant increase in stiffness of the mount may be further enhanced by rendering the volume of the chamber 92 much smaller than that of the chamber 40.

By controlling the action of the valves 56, 62, 74, and 86, it is possible to adjust the characteristics of the mount to given operative conditions of an engine. Since engine movements or vibrations are substantially functions of the revolutions of the engine, the valves may advantageously be controlled in dependence of, i.e., by signals generated by, engine revolutions.

Table I is a concrete example of controlling the valves in dependence of engine revolutions.

TABLE I

Figure 6:
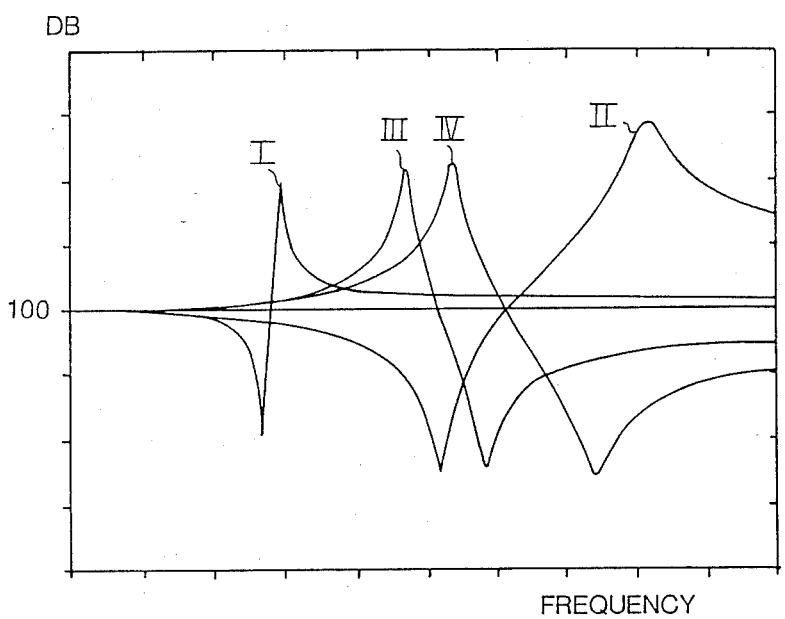
FIG. 6 is a function diagram of the mount of FIG. 4 in a various operative settings.

| rpm | valve 56 | valve 62 | valve 74 | valve 96 | FIG. 6 |
|---|---|---|---|---|---|
| n-1000 | open | open | open | open | Curve I |
| 1000–3500 | closed | closed | closed | closed | Curve II |
| 3500–4000 | open | closed | open | closed | Curve III |
| n-4000 | closed | closed | open | closed | Curve IV |

As shown in the Table, all valves are open when the engine is operating in the range of idling speeds. Axial movements of the core 10b are absorbed without changes in the fluid pressure, by the membrane 88. Because of the mass effect of the fluid in the chamber 86 in front of the membrane 88, the dynamic stiffness decreases in the frequency of idling speeds.

All valves are closed at engine speeds between 1000 and 3500 rpm, that is to say, the diaphragm 41 is connected to the console 66 because of the high stiffness or modulus of elasticity provided by the chambers 52, 58 and 70. The console 66 is, of course, rigidly mounted on the automotive frame (not shown) as mentioned above. Low amplitudes of the core 10b are absorbed by the membrane 88. Mass effects of the fluid result in a decrease in dynamic stiffness. However, the decrease in dynamic stiffness now occurs at higher frequencies owing to the fact that the membrane 88 is yielding less than it was at lower engine revolutions with the valve 96 open. Also, at engine speeds between 1000 and 3500 rpm, fluid is exchanged between the chambers 40 and 42 by way of the throttle 46; and this contributes to some damping by the mount.

When the engine is running at speeds between 3500 and 4000 rpm, the membrane 88 is virtually without effect since the fluid within the chamber 86 cannot now deflect the membrane 88 into the chamber 92 because of the increased pneumatic pressure therein. Therefore, any vibrations or movements of the core 10b can be diverted to the diaphragm 41. The diaphragm 41 is connected to the absorptive mass 64 by way of the chamber 58. Since the valve 74 is open, the absorptive mass 64 may moove freely. The absorptive mass 64 diverts its movements to the flange 48 by way of the chamber 58, and by way of the protrusion 45, the movement of the absorptive mass 64 is diverted to the diaphragm 41 so that changes in pressure in the fluid in chamber 40 and 42 are transferred. Thus, the mount takes on absorptive characteristics. Since the chamber 92 is closed, movements of low frequency and high amplitude cause the diaphragm 41 to move into engagement with one of the flanges 80 or 82. Further movements may take place but lead to increased fluid pressure within the chambers 40 or 42 and to an exchange of fluid through the throttle 46. Thus, the mount provides for damping at low frequency movements of higher amplitude.

At engine speeds in excess of 4000 rpm an even more rigid connection of the absorptive mass 64 to the diaphragm 41 may be desirable, and this may be attained by closure of the valve 56. The resultant stiffness of the connection between the absorptive mass 64 and the flange 48 is a function of the stiffness of, or the pressure within, the chambers 52 and/or 58.

It is, of course, possible further to influence the characteristics of the mount by not fully opening or closing the valves. Instead, the valves, by controlling the size of their openings, may themselves function as throttles. It would also be possible, for instance, to connect the mount to a control circuit which, instead of controlling the valves in accordance with engine revolutions, may generate signals representative of movements transferred by the engine to the frame for controlling the degree of opening of the valves to eliminate the effects of such movements.

FIG. 6 is a schematic representation of the transfer function of the mount of FIG. 5. The abscissa, at 100, represents the static stiffness of the mount. The four curves, I-IV, represent dynamic stiffnesses in dependence of frequencies affecting the mount. Curve I displays the function of the mount with valve 62 in the open condition, i.e., when there is a relatively loose connection between the absorptive mass 64 and the diaphragm 41.

The functional slope of Curve II is similar to that of Curve I; i.e., it shows an initial decrease at low frequencies followed by an increase above the point of absorption up to the resonant frequency, whereupon it asymptotically approaches a value above the static stiffness. Curve II, relative to Curve I, is displaced to a range of relatively higher frequencies, as a result of the higher modulus of elasticity or increased stiffness, of the connection of the absorptive mass 64.

Curves III and IV differ in their configurations than those of Curves I and II. The difference results from the stiffness or moduless of elasticity of the chambers 70 and 92, respectively. As shown, the curves representing the dynamic characteristics of the mount increase with increasing frequencies to above a value corresponding to the dynamic stiffness, and after reaching resonant values, they decrease to values below the static stiffness. In order to draw upon the desirable characteristics of the functions represented by Curves III and IV, only those functions of the mount represented by the trailing portions of the curves should be utilized.

Figure 7:
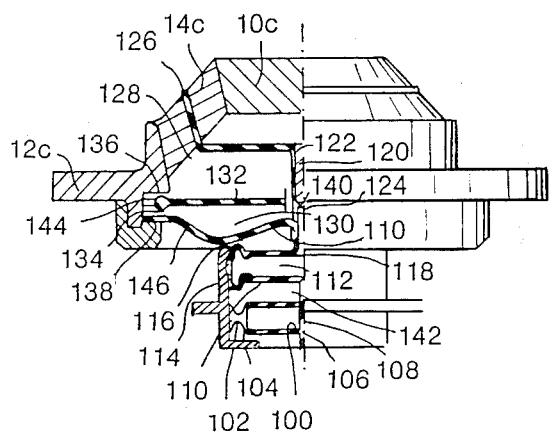
FIG. 7 is a view, partially in longitudinal section, of another embodiment of an engine mount according to the present invention.

FIG. 7 depicts a further embodiment of a mount in accordance with the invention. Again, the mount comprises a core 10c and a base 12c connected to each other by an elastic member 14c in a manner similar to the assembly of FIG. 5. However, the mount of FIG. 7 has an intermediate annular member 126 affixed to its elastic element 14c. Since the member 126 is connected to the elastic element 14c approximately half way between the core 10c and the base 12c, the member 126 would move or vibrate at about half the amplitude of the core 10c.

The annular member 126 is connected to a connecting element 120 by a disc 122 which is provided with large openings. The connecting element 120 is seen to protrude downwardly through chamber 128 and 130 of the mount.

The interior structure of the mount resembles that of the mount of the first described embodiment in that it is divided into two chambers 128 and 130 by a diaphragm 132. The interior of the base 12c is provided with an annular recess having upper and lower wall surfaces or flanges 136 and 138, respectively. The flanges 136 and 138 serve at times as abutments for an enlarged peripheral portion 134 of the diaphragm 132. The diaphragm 132, in a well known manner is attached along its periphery to the base 12c between the flanges 136 and 138 by means of an elastic membrane 144.

A small opening 140 acting as a throttle connecting the chambers 128 and 130 is provided within the diaphragm 132. The chambers 128 and 130 are filled with a fluid, preferably water or silicon oil for example. The lower chamber 130 is sealed by an elastic wall 146. Movements or vibrations of the core 10c may thus be compensated or absorbed by the resiliency of the wall 146 in that it permits the chamber 130 to expand.

The connecting element 120 connects the fluid of the chamber 130 by means of a bore 124 to a further fluid chamber 112 located externally of the chambers 128 and 130. The connecting element 120 for this purpose extends through the resilient wall 146, an appropriate seal being, of course, provided between the wall 146 and the element 120 to prevent an escape of fluid. The third chamber 112 is sealed by a flange 118 provided at the lower end of the connecting element 120. The flange 118 forms one of the walls of the chamber 112. The flange 118 is connected by an elastic member 116 to a console 102 which is attached to an automobile frame (not shown). Side walls of the console 102 constitute lateral walls of the chamber 112, the bottom of which is formed by a disk 110. The disk 110 is of approximately the same size as the flange 118. The disk 110 also is connected to the console 102 by an elastic element 114. A pin-shaped extension 108 protrudes from the bottom of the disk 110. An absorptive mass 100 is provided below the disk 110. The absorptive mass 100 is also connected to the console 102 by an elastic annular member 104. The disk 110, the console 102, and the absorptive mass 100 enclose a pneumatic chamber 142. A solenoid coil 106 is connected to or integral with the absorptive mass 100 and contributes to the mass effect of the absorptive mass 100. The extension 108 of the disk 110 may be made of ferritic material and functions as a plunger penetrating into, and movable by, the coil 106.

The function of the mount of FIG. 7 is as follows:

The fluid with the chamber 130 is in communication with the chamber 112 by means of the bore 124 and the connecting element 120. Movements or vibrations of the core 10c lead to similar movements or vibrations in the annular member 126 and, by way of the connecting element 120, in the flange 118. This leads to a change in the pressure in the chamber 112. The pressure changes are transferred to the disk 110 which is coupled to the absorptive mass 100 by the chamber 142.

The modulus of elasticity of the chamber 142 determines the degree of coupling of the absorptive mass 100 to the disk 110. The mass 100 will respond to vibrations of the disk 110 because of its connection to the console 102 by an elastic member 104 which possesses low compressive stiffness and high bulk stiffness. The stiffness of the connection between the absorptive mass 100 and the disk 110 may be adjusted by changing the pressure within the chamber 142. This may be accomplished by the solenoid 106 which, when current flows through it, will pull the disk 110 towards the absorptive mass 100. the degree of attraction between the disk 110 and the absorptive mass is a function of the level of current flowing in the coil 106. By regulating the current in the foil 106, the absorptive frequency may be adjusted in accordance with engine revolutions. When the solenoid 106 is not energized and the chamber 142 is not pressurized, the absorptive mass 100 is substantially disconnected from the disk 110.

In order to render the adjustment of the absorptive frequency in accordance with engine revolutions more independent of tolerance characteristics, the modulus of elasticity of the chamber 142 may be regulated or controlled in a different manner. For instance, a reading may be taken of the amplitude of movement of the absorptive mass 100 relative to the flange 118 or the annular member 126 moved simultaneously therewith. Measuring the relative amplitude may be accomplished by the solenoid 106.

Awareness of the phase relationship of the vibrations of the absorptive mass 100 may be necessary. Thus, the vibrations between the absorptive mass 100 and the console 102 may be measured, for instance, by changes in the capacity between the absorptive mass 100 and a limiting plate to be positioned under it. As such a measurement serves to determine the phase relationship only, it does not require great precision. The parameters derived from such a measurement may serve to adjust the volume or pressure of the chamber 142 by adjustment of the solenoid 106 in such a manner that the absorption frequency of the mount may always be optimally adjusted to occurring frequencies.

Other functional characteristics of the amount at low and high amplitudes, as well as the function and effect of the diaphragm 132 and the throttle 140 have already been described in connection with the previous embodiment and need not here be repeated.

If desired, the throttle 140 may be provided with a bypass valve (not shown) by means of which the mount may be maintained soft at low frequency or high amplitudes so that at large deflections of the core 10c the periphery of the diaphragm 132 does not engage the flanges 136 or 138, and balancing of pressure between the chambers 128 and 130 may instead be accomplished by such a bypass (not shown).

Figure 8:
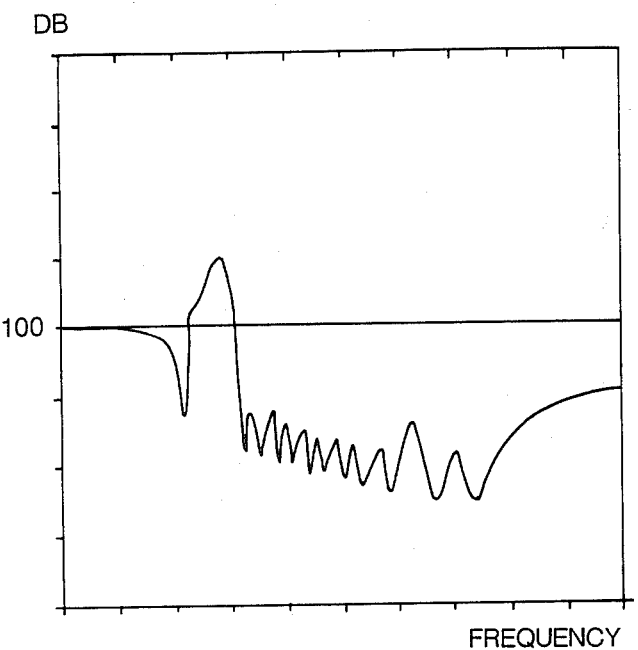
FIG. 8 is a function diagram of the mount of FIG. 7.

FIG. 8 is a diagram of the transfer function of the mount of FIG. 7. At frequencies up to about 40 Hz the dynamic characteristics of the mount are chiefly a function of the deflection of the diaphram 132. In such cases it is advantageous not to connect the absorptive mass 100 to the mount, by maintaining the solenoid 106 deenergized and by venting the chamber 142. At higher frequencies, the effects of the absorptive mass 100 become desirable, and the degree of coupling may be adjusted by energizing the solenoid 106 by current of an appropriate level. The various current levels are the causes for the individual peaks of the dynamic stiffness above a frequency of 60 Hz.

Figure 9:
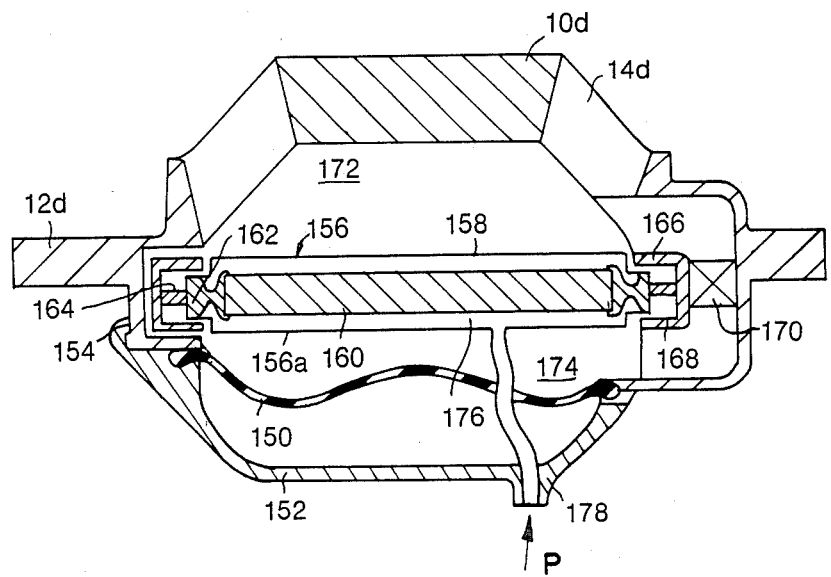
FIG. 9 is a third preferred embodiment of a hydraulic engine mount in accordance with the invention.

FIG. 9 depicts another embodiment of a mount in accordance with the invention. The mount is shown to be provided with a core 10d connected to a base 12d by an elastic member 14d. The interior of the mount is divided into two chambers 172 and 174. The upper chamber 172 is defined by the core 10d, the elastic member 14d and a diaphragm 156. The lower chamber 174 is defined by the diaphragm 156 and a resilient wall 150. Both chambers may be filled with a fluid.

The diaphragm 156 is seen to comprise two layers 156a and 158 between which there is provided a chamber 176. The diaphragm 156 is connected to an annular retaining member rigidly mounted to be base 12d by means of an elastic membrane 164. The retaining member is provided with annular flanges 166 and 168 which will be engaged by the diaphragm 156a, 158 in case of large deflections thereof. At low amplitude vibrations, the diaphragm 156 may vibrate freely due to its elastic suspension by the membrane 164. At larger amplitudes, deflection of the diaphragm 156 is limited by one of the flanges 166 or 168 (depending on the direction of diaphragm deflection).

Furthermore, a small connecting passage 154 functioning as a throttle is provided between the chambers 172 and 174. The throttle may establish a pressure equilibrium in the chambers 172 and 174, at least at low amplitude vibrations. At higher amplitudes, the flow of fluid between the chambers is too limited to provide for pressure balancing.

Up to this point, the mount of FIG. 9 does not distinguish from prior art mounts.

In accordance with the invention, the mount of FIG. 9 is provided with an absorptive mass 160 seated within the chamber 176 enclosed by the layers 156a and 158 of the diaphragm 156. The absorptive mass 160 is connected along its periphery to the inner margin of the layers 156a and 158, by an elastic suspension 162. The suspension 162 is of a material having low compression stiffness and high bulk stiffness. The space enclosed by the layers 156a and 158 and enclosing the absorptive mass 160 serves as a pneumatic cushion which provides a connection of predetermined stiffness or modulus of elasticity between the absorptive mass 160 and the layers 156a and 158 of the diaphragm 156. The pressure within the chamber 176 and, therefore, its stiffness may be regulated by a duct 178. It is important in respect of the desired transfer characteristic that the effective surface of the core 10d is smaller than the effective surface of the diaphragm 156a, 158.

The mount is also provided with a bypass for connecting the chambers 172 and 174 and which may be selectively opened and closed by a valve 170. When the valve 170 is in its open condition, the mount is soft in respect of vibrations of large amplitude, such characteristic being particularly desirable at engine revolutions in the idling range. Movements of large amplitude typically occurring during starting of an engine or during its warm-up phase may thus be absorbed by opening the valve 170. At higher engine revolutions the valve 170 may be closed.

The frequency response of the mount in accordance with FIG. 9 is also shown in FIG. 8. As depicted, the function of the mount is substantially adjustable at frequencies in excess of 60 Hz, by adjusting the pressure or volume of the chamber 176 to optimum values relating to such frequencies, by way of the duct 178. The adjustments may be made on the basis of engine revolutions or by the kind of control referred to above.

Figure 10:
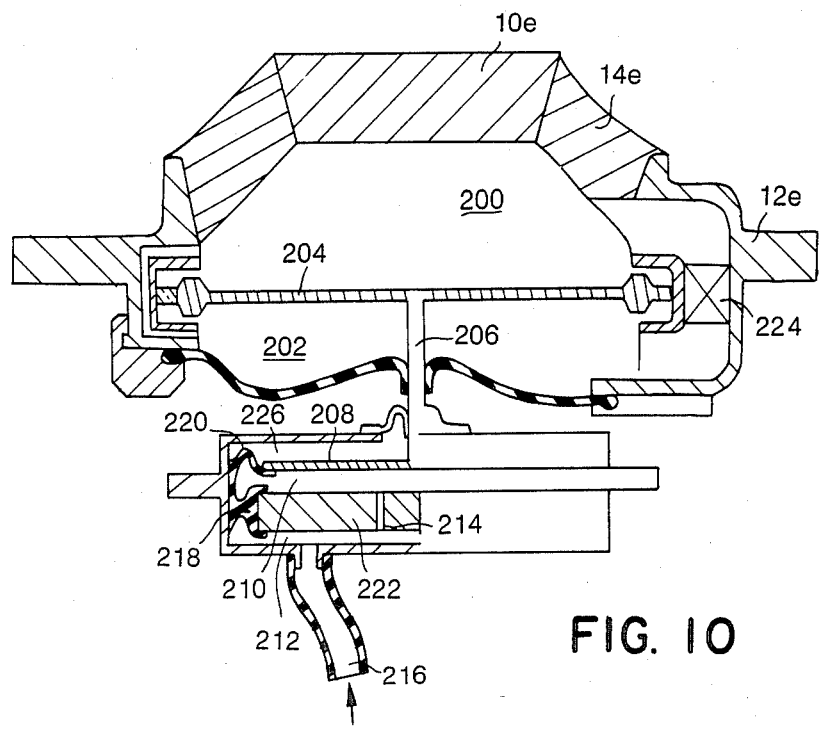
FIG. 10 depicts, partially in longitudinal section, a fourth embodiment of a hydraulic engine mount in accordance with the invention.

FIG. 10 displays yet another embodiment of a mount in accordance with the invention. The mount comprises a core 10e, a base 12e and an elastic element 14e for connecting the core 10e to the base 12e. The interior of the mount is divided into two chambers 200 and 202 by a diaphragm 204. The suspension of the diaphragm 204 is similar to the suspension of previously described embodiments. Also, there is provided a throttle for establishing a connection between the chambers 200 and 202. The diaphragm 204 is provided with a protrusion 206 which ends in a flange 208 outside or below the chamber 202. The flange 208 constitutes the upper wall of a pneumatic chamber 210, the bottom wall of which is constituted by an absorptive mass 222. The flange 208 and the diaphragm 204 may be elastically moved as a unit. The flange 208 is for this reason circumferentially suspended by an elastic seal 220. The absorptive mass 222 is secured by an elastic member 218 of low compression stiffness and high bulk stiffness. A bore 214 in the absorptive mass 222 connects the chamber 210 to another chamber 212 below the absorptive mass 222 so that the mass 222 may be subjected to equal pneumatic pressure acting on both of its surfaces. The pneumatic pressure may be controlled by a duct 216.

In a manner similar to the embodiment of FIG. 9, there is also provided a bypass including a valve 224 for eliminating the effect of the throttle between the chambers 200 and 202.

Movement or deflection of the diaphragm 204 is transferred to the flange 208 of the chamber 210. The volume or pneumatic pressure within the chamber 210 constitutes an absorptive spring or mass in as much as its modulus of elasticity determines the degree of coupling between the absorptive mass 222 and the diaphragm 204.

The absorptive mass 222 is also elastically connected to a console such as the frame of an automobile (not shown) by way of the pneumatic chamber 212. Thus, an increase in pressure in the chambers 210 and 212 leads also to an increased resilient stiffness so that by adjusting the pressure within the connected chambers 210 and 212 the resilient stiffness and, therefore, the absorptive frequency may also be adjusted in dependence of the operative condition of an engine (not shown). It is important that the pressure within the chamber 210 affecting the flange 208 as well as the diaphragm 204 be compensated by counterpressure effective at the upper surface of the flange 208 to avoid deviation of the diaphragm 204 from its center position.

By raising the pressure on both sides of the flange 208 in the chambers 210 and 226 it is possible, for instance, to render the diaphragm 204 harder in its deflections. Thus, the mount overall takes on increased hardness which may be a desirable feature under changing loads, for instance.

Also, the absorptive frequency may be influenced over a wide range if the pressure within the chambers 210 and 212 instead of being connected by a bore 214 could be adjusted individually in each chamber. This, however, would require that unilaterally occurring biases be taken into consideration and, if necessary, be compensated.

Figure 11:
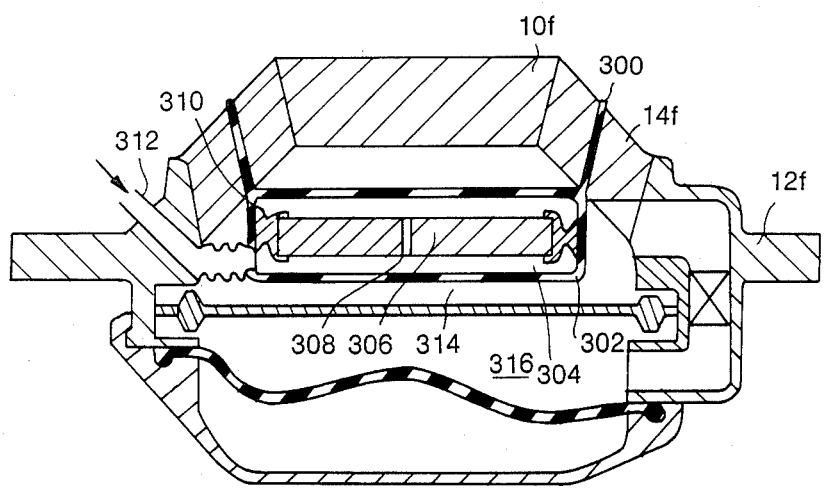
FIG. 11 is a longitudinal sectional view of a fifth embodiment of a hydraulic engine mount in accordance with the present invention.

Finally, FIG. 11 displays a further embodiment of a mount incorporating the teachings of this invention. The mount comprises a core 10f which is connected to a base 12f by an elastic member 14f. About half way between the core 10f and the base 12f there is seated within the member 14f an annular insert 300 which vibrates at the same frequency as the core 10f, yet at a lesser amplitude.

The interior of the mount is divided into two chambers 314 and 316. A dividing diaphragm and an elastic suspension therefor, as well as a throttle and a bypass are provided in the manner of previously described embodiments. In the present embodiment, however, there is provided as an integral part of the annular member 300 a member forming a chamber 304 which is hermetically sealed with respect to the chamber 314. An absorptive mass 306 is suspended by elastic members 310 within the chamber 304. The elastic members 310 possess low compressive stiffness and high bulk stiffness. The absorptive mass 306 is free to vibrate within the chamber 304, there being provided for this purpose a bore 308 within the mass 306 for maintaining a pressure equiliberium on both sides of the mass 306. This also prevents deviation of the mass 306 from its center position. The pressure within the chamber 304 is adjustable by way of a duct 312 for controlling the degreee of coupling of the absorptive mass 306 to the core 10f of the mount.

The duct 312 is opened whenever normal absorption characteristics of a dual chamber hydraulic mount are desired. That is to say, vibrations of the core 10f lead to increased pressure in the chamber 314 and this increased pressure is balanced or compensated through movement of the diaphragm in the direction of the chamber 316. Under these conditions, the absorptive mass 306 is without effect for the vibrations of the annual member 300 are not transferred to the absorptive mass 306 as there is no effective pneumatic cushion acting as a motion transfer member within the chamber 304. The elastic suspension 310 is sufficiently compressive to prevent the transfer of significant forces.

By closing the duct 312 a pneumatic cushion is formed within the chamber 304. This cushion serves to transfer vibrations of the annular member 300 to the absorptive mass 306 by way of walls 302 of the chamber 304. By increasing the pressure within the chamber 304, its stiffness may be increased so that the absorptive characteristics of the mount may be adjusted to suit given frequencies.

It is believed that the various embodiments decribed demonstrate that the objects of the invention set forth above have been met.

What is claimed is:

1. An apparatus for selectively absorbing movements of variable frequency and amplitude between an automotive engine and the frame of a vehicle, comprising:

core means for connecting to one of said engine and said frame;

base means for connecting to the other of said frame and said engine;

means for providing an elastic connection between said core means and said base means;

means including said core means, said base means and said connection means for forming at least one resiliently deformable and substantially sealed chamber adapted to be filled with a substantially incompressible fluid;

diaphragm means for dividing said at least one chamber into at least two sections and mounted for movement in response to relative movement at a first range of frequency and amplitude between said core means and said base means, one of said sections being provided intermediate said core means and one surface of said diaphragm means;

means for limiting said movement of said diaphragm means at relative movement at a second range of frequency and amplitude in excess of said first range between said core means and said base means;

throttle means for providing a limited exchange of fluid between said at least two sections in response to relative movement within substantially said first range;

means for providing an absorptive mass moving substantially out of phase with said relative movement at frequencies and amplitudes substantially within said first range;

means comprising a selectively inflatable and expandable first fluid chamber positioned intermediate said absorptive mass means and another surface of said diaphragm means for selectively connecting said absorptive mass means with one of said elastic connection means and said other surface of said diaphragm means.

2. The apparatus of claim 1, wherein said first chamber comprises an annular tubular chamber.

3. The apparatus of claim 2, wherein said connecting means further comprises a second inflatable chamber positioned between said other surface of diaphragm means, said absorptive mass means, and said tubular chamber.

4. The apparatus of claim 3, further comprising means for selectively connecting said absorptive mass means with said frame.

5. The apparatus of claim 4, wherein said means for selectively connecting said absorptive mass means with said frame comprises a third inflatable fluid chamber positioned intermediate said absorptive mass means and said frame.

6. The apparatus of claim 5, wherein said first, second, and third fluid chambers are provided with valve means for selectively pressurizing and venting said chambers, whereby said selective connections are functions of the pressure within said chambers.

7. The apparatus of claim 6, wherein said first, second and third chambers are pneumatic chambers.

8. The apparatus of claim 7, wherein at least one of said valves is connected to means for generating signals representative of engine performance.

9. The apparatus of claim 8, wherein said signals are representative of engine revolutions.

10. The apparatus of claim 8, wherein said signals are representative of movements of said engine relative to said frame.

* * * * *